United States Patent

Bates et al.

[11] 4,075,966
[45] Feb. 28, 1978

[54] SPRING BIASED SNAP HOOK AND METHOD

[75] Inventors: A. Arthur Bates, Lakewood, Ohio; Norman J. Cook, E. Greenwich, R.I.

[73] Assignee: Zaleboats, Incorporated, East Greenwich, R.I.

[21] Appl. No.: 716,105

[22] Filed: Aug. 20, 1976

[51] Int. Cl.² .............................................. B63H 9/04
[52] U.S. Cl. ................................. 114/114; 24/73 HR; 24/239
[58] Field of Search ............ 24/231, 238, 239, 241 PS, 24/241 SL, 73 HR; 294/83 R, 75; 114/108–115

[56] References Cited
U.S. PATENT DOCUMENTS

| 652,735 | 6/1900 | Schofield | 114/114 |
|---|---|---|---|
| 659,425 | 10/1900 | White | 24/239 |
| 710,497 | 10/1902 | Myers | 24/239 |
| 2,216,499 | 10/1940 | Ohotto | 24/241 SL |
| 3,646,645 | 3/1972 | Bauer | 24/241 SL |
| 3,811,158 | 5/1974 | Merser | 114/114 |

Primary Examiner—Trygve M. Blix
Assistant Examiner—Jesus D. Sotelo
Attorney, Agent, or Firm—Fay & Sharpe

[57] ABSTRACT

A spring biased snap hook having a body fabricated from a developed sheet metal blank. The body has a pair of recessed areas extending inwardly from one edge thereof and this one edge also includes locking member receiving areas spaced longitudinally therealong. An elongated locking member is received in these receiving areas and is longitudinally movable along the one body edge between a first position blocking access to both recess areas and a second position providing access to one of the recessed areas. A spring bias continuously urges the locking member toward the first position. A handle or keeper member is releasably affixed to the outermost end of the locking member to retain this member in operable association with the body. Removal of the handle or keeper permits the locking member to be moved longitudinally along the one body edge in a direction opposite to the movement thereof from the first to the second position in order to provide selective access to the other of the recess areas.

22 Claims, 10 Drawing Figures

SPRING BIASED SNAP HOOK AND METHOD

BACKGROUND OF THE INVENTION

This invention pertains to the art of snap hooks and more particularly to spring biased snap hooks.

The invention is particularly applicable to spring biased snap hook which comprises a jib hank and will be described with particular reference thereto; however, it will be appreciated by those skilled in the art that the invention has broader applications and may be adapted to other environments where a snap hook type arrangement may be advantageously utilized.

Jib hanks are typically employed in sailing vessels for affixing the outermost edge or margin of a jib sail to the forestay for ease of raising and lowering the sail as well as for ease of removing the sail from the forestay when desired. Conventionally, this forestay comprises a stainless steel rope or rod which runs from the bow of the sailing vessel to the upper area of the mainmast. Ease of raising and lowering the jib as well as installation and removal thereof is important in view of the fact that the sail jib is quite often adjusted during actual sailing and is normally removed from the vessel, at least for drying and many times for storage purposes, when the boat is not in use.

Jib hanks are known in the art and have heretofore comprised any number of styles and configurations. Usually, the jib hank includes two loop-like areas with one of these loops adapted to be loosely received over the forestay. The other loop is adapted to be connected to the jib sail itself through eyelets or the like disposed longitudinally along the edge or margin of the jib which is to be closely spaced to the forestay itself. Prior jib hanks have included various means for opening and closing these loop-like areas to facilitate their installation on the forestays and sails. Moreover, these prior jib hanks have been designed in a manner such that at least one of the loops may be easily opened and closed to facilitate ease of installation and removal of the sail on the forestay. Normally, the loop which was easily opened and closed was the loop designed to be received over the forestay itself.

While prior jib hanks have taken many shapes and configurations, such prior designs have had a number of disadvantages in practical use. First, prior jib hanks have typically been rather complicated in design and construction which rendered the individual jib hanks rather expensive. The expense for the individual jib hanks must be multiplied by the substantial number of them required and employed in a single sailing vessel jib sail environment. The result was that these prior jib hank designs were cost prohibitive to many boat owners.

Another problem with prior jib hanks has been in the types of construction involved. Many of the prior jib hanks have been cast or forged from metal which can be a rather expensive manufacturing process due to the necessity for extra machinery steps required to complete the structures. Moreover, such prior cast or forged jib hanks were extremely brittle and oftentimes snapped or broke during use. This breakage has been particularly evident and/or troublesome during installation and removal of the jib hanks from a jib sail and/or forestay.

The present invention contemplates a new article and method for making same which overcomes all of the above referred to problems and others and provides a new spring biased snap hook which is simple and economical to manufacture, reliable in use, has a long useful life and which is readily adapted to use in any number of environments where spring biased snap hooks are required or useful.

BRIEF DESCRIPTION OF THE INVENTION

In accordance with the present invention, there is provided a new spring biased snap hook and method for making same. The snap hook is comprised of a generally planar body having spaced apart inner and outer edges and spaced apart end edges. The body includes first and second separate member receiving recess areas extending inwardly from the inner edge toward the outer edge with the inner edge also including recess area locking or closing member receiving means thereon. An elongated locking or closing member is received in these receiving means for selectively closing the first and second recess areas and which locking member is selectively longitudinally movable between a first normal position blocking or closing both of the recess areas and a second position whereby at least one of the recess areas is opened. Biasing means continuously urge the locking member toward the first position and moving means are provided to facilitate movement of the locking member from the first toward the second position.

In accordance with another aspect of the present invention, the body portion is formed from a developed sheet metal blank with the member receiving recess areas and locking member receiving means integrally formed therein.

In accordance with another aspect of the present invention, the locking member comprises an elongated member having inner and outer ends with the distance between these ends being such that when the locking member is in the first position, the inner end is embraced by the receiving means adjacent one body end edge. The outer end protrudes through the receiving means adjacent the other body end edge with a portion of the locking member then passing through the receiving means adjacent the other end edge as the locking member is moved from the first toward the second position.

In accordance with still another aspect of the present invention, the locking member inner end includes an outwardly extending flange or shoulder adapted to be closely slidably received in the receiving means adjacent the one body end edge. The locking member further includes first and second sleeves received thereon with the first sleeve having a length sufficient to at least cover one of the recess openings and the second sleeve having a length sufficient to at least cover the other of the recess openings when the locking member is in the first position. One of the sleeves comprises a hollow cup-like member which receives the other of the sleeves when the locking member is moved from the first to the second position and the biasing means is disposed between the two sleeves in order to continuously urge the locking member toward the first position.

In accordance with a still further aspect of the present invention, the moving means for the locking member comprises a handle or retainer which is removably affixed to the locking member adjacent the outer end thereof with this handle or retainer engaging the outboard side of the receiving means adjacent the other body end edge when the locking member is in the first position. This handle or retainer may be easily removed in order that the locking member may be moved longitudinally along the body inner edge toward the one body end edge in order to expose the other of the recess openings.

In accordance with still another aspect of the present invention, there is provided a new method for forming the snap hook body from a developed sheet metal blank.

The principal object of the present invention is the provision of a new and improved spring biased snap hook which is easily and quickly attached without tools and with no breakage.

Another object of the present invention is the provision of a new and improved snap hook and method for making same which are simple in design and economical to manufacture.

Another object of the present invention is the provision of a new and improved spring biased snap hook and method for making same which is reliable and sturdy in construction.

Still another object of the present invention is the provision of a new and improved spring biased snap hook and method for making same which may be manufactured from readily available materials.

Yet another object of the present invention is the provision of a new and improved spring biased snap hook and method for making same which is easy to use and readily adapted to use in any number of different environments employing or requiring a snap hook type arrangement.

Other objects and uses for the invention will become apparent to those skilled in the art upon a reading and understanding of the specification.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein.

DESCRIPTION OF THE PREFERRED EMBODIMENT

Figure 1:
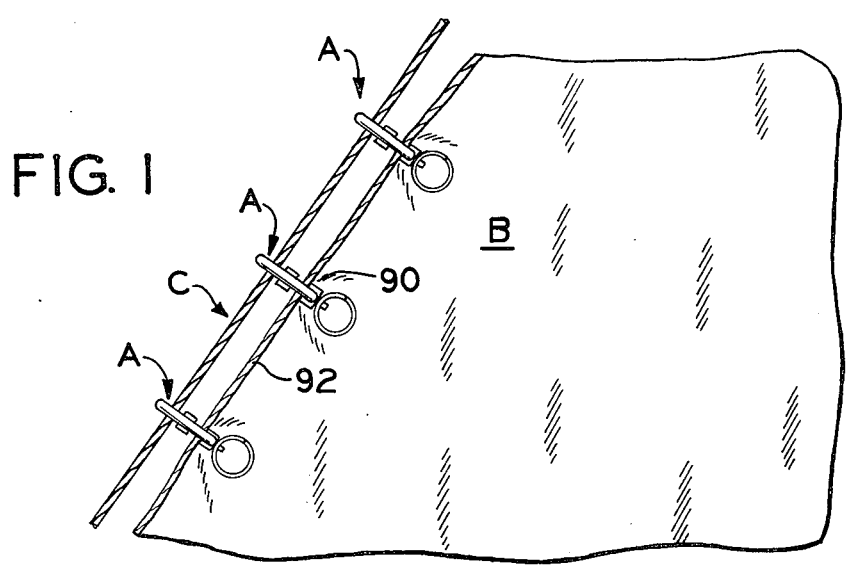
FIG. 1 shows the subject spring biased snap hook when used as a jib hank for a sailing vessel.

Referring now to the drawings wherein the showings are for purposes of illustrating the preferred embodiment of the invention only and not for the purposes of limiting same, the FIGURES show the subject invention employed as a jib hank A to releasably and slidably locate a jib sail B relative to an elongated forestay C. While three such jib hanks A are shown in FIG. 1, the showing therein is merely for purposes of appreciating the environment of preferred use for the invention and that many other of the jib hanks A are disposed longitudinally along jib sail B over the marginal edge thereof disposed adjacent forestay C.

Figure 2:
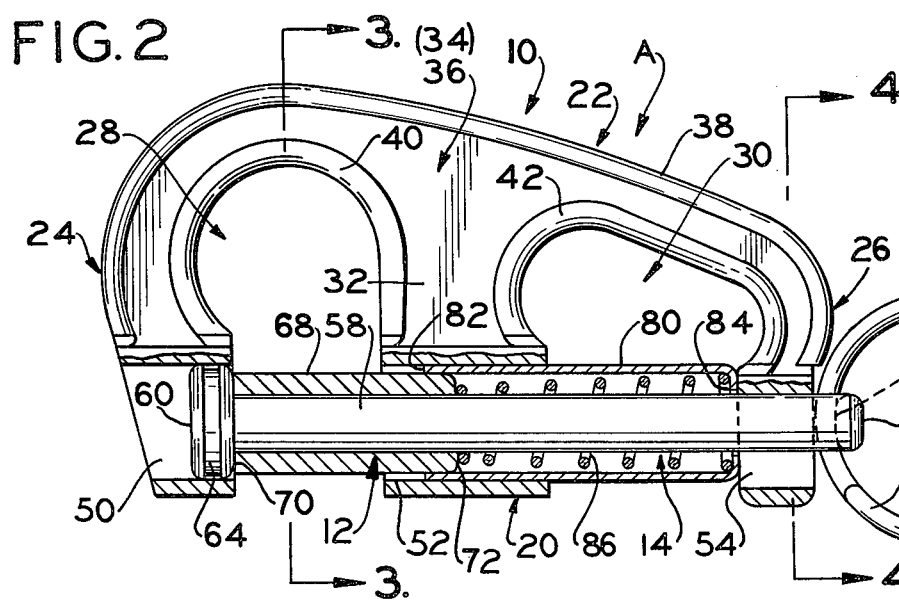
FIG. 2 is a side elevational view of the subject snap hook in partial cross section for ease of illustration and appreciation of the invention.
Figure 3:
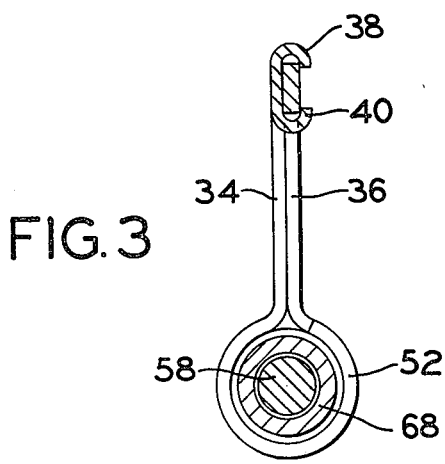
FIG. 3 is a cross-sectional view taken along lines 3—3 of FIG. 2.
Figure 4:
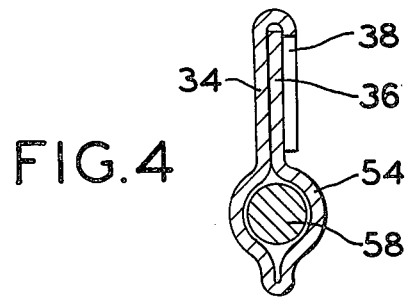
FIG. 4 is a cross-sectional view taken along lines 4—4 of FIG. 2.

Referring particularly to FIGS. 2–4, jib hank A is comprised of a body or frame generally designated 10, a locking member or pin generally designated 12, a biasing member generally designated 14 and a handle or keeper generally designated 16.

Body or frame 10 has an inner edge 20, an outer edge 22 and spaced apart end edges 24, 26. A first recess area 28 extends from inner edge 20 toward outer edge 22 and a second recess area 30 extends from inner edge 20 toward outer edge 22 with these recesses areas being separated by a web 32 which comprises a part of body 10 itself. As best shown in FIGS. 3 and 4, the body is comprised of a pair of body halves 34, 36 which are preferably formed from a developed sheet metal blank in a manner which will be described in detail hereinafter. Body half 34 includes an outer end flange 38 adjacent outer edge 22, a first recess area flange 40 extending peripherally around first recess area 28 therein and a second recess area flange 42 extending peripherally around the second recess area 30 therein. Flanges 38, 40 and 42 are then crimped or bent over the adjacent areas of body half 36 in order to retain the bodies in a unitary rigid relationship with each other.

As body 10 is formed from body halves 34, 36, cylindrical locking member receiving openings 50, 52 and 54 are also formed at spaced apart longitudinally aligned locations along inner edge 20. The reasons for and use of these locking member receiving openings will become apparent hereinafter. It should be noted, for reasons which will also become apparent hereinafter, that locking member receiving openings 50 and 52 have have the same internal diameter while locking member receiving opening 54 has a somewhat smaller diameter than openings 50, 52. Openings 50, 52 and 54 ae coaxially disposed with each other and the common longitudinal axis of openings 50, 52 and 54 is parallel to the plane of body or frame 10 and preferably falls within that plane. These locking members receiving openings are integrally formed in body 10 during forming of the body from body halves 34, 36 as will hereinafter be described.

Preferably, body frame 10 is constructed from stainless steel because of its high resistance to corrosive or destructive environments or conditions to which a jib hank is typically subjected during actual use. Moreover, and during fabrication, the body is fully passivated to further protect it from these corrosive or destructive environments or conditions. In some cirumstances, it is also deemed advantageous to coat body frame 10 with a fluoropolymer to obtain even further protection therefor. While the particular shapes of first and second recess areas 28, 30 may vary from application to application, when used in the preferred environment as a jib hank, first recess area 28 has a generally circular configuration and second recess area 30 has a generally elongated or oblong configuration. The reason for this construction is the fact that forestay C has a generally circular cross-section and is loosely received in first recess area 28. Moreover, the generally elongated or oblong configuration of second recess area 30 is such that it may receive an eyelet disposed in the jib sail itself and extend from the eyelet over the marginal edge of the sail in a manner which will be described hereinafter.

Locking member or pin 12 is comprised of an elongated shaft 58 having an inner end 60 and an outer end 62. Disposed at inner end 60 to extend radially outward thereof is a shoulder 64 which is dimensioned so as to be slidably received within locking member receiving openings 50, 52 in a manner to be described hereinafter. Shaft 58 is dimensioned so that when the locking member or pin is in the position shown in FIG. 2, outer end 62 will extend through and outwardly of locking member receiving opening 54. A through hole 65 is disposed adjacent outer end 62 and receives the handle or keeper generally designated 16.

In the preferred embodiment of the invention, the handle or keeper comprises a closed loop or ring member 66 having at least a pair of closely spaced turns and generally resembles a conventional removable key ring structure. In the position of locking member or pin 12 shown in FIG. 2, ring member 66 is closely spaced to and normally engages the outside edge of cylindrical locking member receiving opening to define a first, normal or closed position for the locking member. Other types and styles of handles or keepers could be substituted for the loop or ring member 66 without departing from the intent or scope of the present invention. It is necessary to a full and complete functioning of the jib hank, however, that the handle or keeper be easily removable from association with the locking member shaft 58.

A first sleeve 68 is closely slidably received over shaft 58 and has an inner end face 70 which engages the adjacent face of shoulder 64 and an outer end face 72. A second sleeve generally designated 80 has a generally open ended cup-shaped configuration. This sleeve has an open inner end 82 and a partially closed outer end 84 which defines a shoulder area and more closely surrounds shaft 58 than open end 82. The diameter of second sleeve 80 is greater than the diameter of receiving opening 54 so that the sleeve is effectively blocked from passing therethrough. For this purpose and as noted hereinabove, the diameter of receiving opening 54 is less than the diameter of the associated receiving openings 50, 52. The inner diameter of second sleeve 80 is such that first sleeve 68 may be slidably received thereinto at least over a portion of the length thereof. Moreover, and in the first position of the locking member, first sleeve 68 has a length sufficient to extend completely across recess area 28 and into receiving opening 52 and second sleeve 80 has a length sufficient to extend completely across recess opening 30 and into receiving opening 52.

In the preferred embodiment here under discussion, the biasing member generally designated 14 comprises a tapered coil spring having a plurality of turns 86 therein. The normal position for this spring is in an expanded condition with one end turn thereof engaging outer end face 72 of first sleeve 68 and the other end turn engaging a portion of outer end or shoulder 84 of second sleeve 80. In this manner, locking member 12 is continuously biased toward the first position with the first and second sleeves continuously biased axially away from each other for reasons which will be described hereinafter. Moreover, the taper of spring 14 is such that the left hand end of the spring as viewed in FIG. 2 engages shaft 58 and the right hand end engages the inside wall of second sleeve 80. In this manner, locking member or pin 12 with sleeves 68, 70 and spring 14 will remain intact during assembly as will also be described in detail hereinafter.

Preferably, locking member or pin 12 is constructed from stainless steel which has been fully passivated. First sleeve 68 is preferably constructed of a plastic material such as polytetrafluoroethylene, acetal resin or the like and second sleeve 80 is constructed from stainless steel tubing which has been thoroughly passivated. Of course, other materials could also be advantageously employed when practicing the concepts of the present invention and use of such alternative materials does not depart from the intent or scope of the present invention.

With the above structural description of the jib hank, description will hereinafter be made with reference to the preferred use and operation of the jib hank. As shown in FIG. 2, locking member 12 is in a first or normal position with shoulder 64 closely received in cylindrical locking member receiving opening 50 in a manner such that shaft 58 with sleeve 68 closely received thereover blocks recess area 28 and shaft 58 with second sleeve 80 received thereover blocks or closes recess area 30. Spring 86 acts to continuously urge the components to this first position with closed loop or ring 66 engaging the outer edge of cylindrical locking member receiving openings 54. When it is desired to open or expose receiving oening 28, it is merely necessary to pull on loop or ring 66 longitudinally or shaft 58 in a direction away from body or frame 10. This pulling overcomes the biasing force of spring 86 in order that the shaft may be longitudinally withdrawn from the body member through receiving openings 52, 54 in the direction of the pulling force. With this movement, first sleeve 68 is closely received in second sleeve 80 and retraction or withdrawal of the locking member or pin may continue until first recess area 28 is fully opened or exposed. This full opening or exposure will occur as shoulder 64 engages inner end 82 of second sleeve 80 with such engagement thus acting as a positive stop and defining a second position for the locking member. When the pulling force exerted against loop or ring 66 is released, the locking member or pin will automatically move from the second position back for the first position under the urging of spring 86.

When it is desired to open or expose second recess area 30, it is simply necessary to remove loop or ring 66 from its association with outer end 62 of shaft 58 and then longitudinally withdraw the locking member from the other end of body or frame 10 through receiving openings 54, 52 and 50. Reassembly of the locking member or pin is then performed in a reverse manner from that just described with regard to disassembly.

With reference to FIGS. 1 and 2 in a typical sailing vessel environment, jib hank A is first mounted to jib sail B with that portion of body or frame 10 which includes cylindrical locking member receiving opening 54 being passed through an eyelet or grommet (not shown)) which are inserted into sail B adjacent the marginal edge 90. Typically, these grommets are hammered into position. Marginal edge 90 includes a conventional jib stay 92 disposed therealong with the edge and stay being received in second recess area 30. Inasmuch as the jib sail construction B, including the eyelets, marginal edge and stay are deemed conventional and do not form a specific part of the present invention, they are not described in further detail herein. However, and in prior jib hank arrangements, the individual jib hanks were bent onto the grommet and, in some instances, even sewn onto them. Installation of each jib hank resulted in a 5 to 10 minute operation.

Once the jib hank has been located on an eyelet in the manner described, locking member or pin 12 may be longitudinally inserted through locking member receiving openings 50, 52, 54 so that outer end 62 protrudes outwardly of locking member receiving opening 54. In this position, loop or ring 66 is affixed to shaft 58 through the receiving hole (not shown) adjacent outer end 62. This process is then repeated until similar jib hanks A are installed on sail B along marginal edge 90 at each eyelet location.

Following such installations and when it is desired to mount sail B to forestay C, it is merely necessary to move locking members or pins 12 from their first to their second positions in order that first recess area 28 may be located over the forestay. Once so located, the locking members or pins are allowed to again assume their first position to thereby lock the sail in position.

The jib hank hereinabove described allows easy movement of jib sail B along forestay C for sailing or storage purposes. Moreover the jib hank structure facilitates easy installation and removal of the sail from the forestay whenever desired by simply moving the locking member or pin for each jib hank from the first to the second position to expose or open first recess opening 28.

Specific reference will now be made to FIGS. 5-10 and a description of the method employed to form the body or frame for jib hank A which may then receive a locking member or pin to complete the hank assembly. For ease of illustration in appreciating the invention, the components have been given new numerals.

Figure 5:
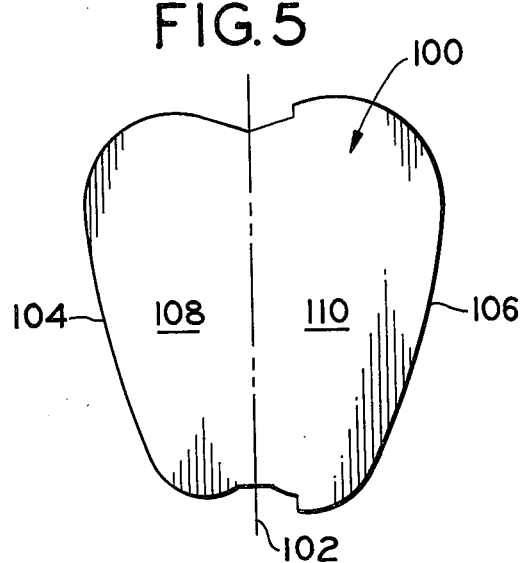
FIGS. 5–10 schematically show the formation of a snap hook body in accordance with the concepts of the present invention.
Figure 6:
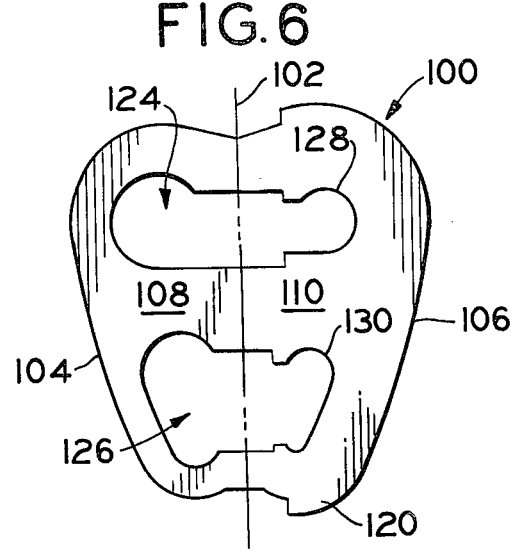

In FIG. 5, there is provided a developed sheet metal blank 100 having a longitudinal centerline 102 with outer edges 104, 106 spaced apart from and on each side of centerline 102. That portion of blank 100 disposed between the centerline and outer edge 104 comprises one blank half generally designated 108 and that portion of blank 100 extending from the centerline to outer edge 106 defines another blank half generally designated 110. As will be noted, blank 100 is not initially symmetrical about centerline 102 and includes an outwardly extending marginal area 120 at and over a substantial portion of outer edge 106. The reason for including this outwardly extending area will become readily apparent hereinafter.

Once blank 100 has been stamped from the sheet metal stock, the next operation comprises the stamping or piercing of first and second openings 124, 126 into the blank. These openings are spaced apart from each other along longitudinal centerline 102 and extend outwardly from each side of the centerline toward outer edges 104, 106. In the initial stamped or blanked condition, openings 124, 126 also are not symmetrical about the centerline. Rather in blank half 110, opening 124 includes an inwardly extending marginal area generally designated 128 adjacent the area thereof most closely spaced toward outer edge 106 and second opening 126 includes a similar inwardly extending marginal area generally designated 130.

Figure 7:
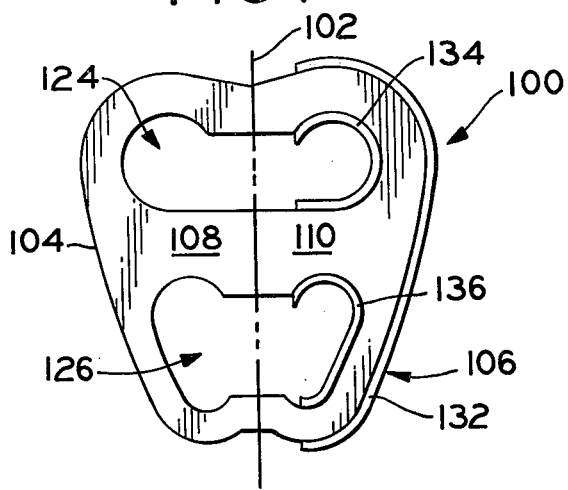

In FIG. 7, outwardly extending marginal area 120 and inwardly extending marginal areas 128, 130 are bent upwardly in a plane generally normal to the plane of blank 100 itself so that area 120 thus defines an outwardly extending flange generally designated 132, inwardly extending area 128 defines an outwardly extending flange generally designated 134 and inwardly extending area 130 defines an outwardly extending flange generally designated 136. Flanges 132, 134 and 136 all extend outwardly from the plane of blank 100 in the same direction. In FIG. 7, it will be noted that blank halves 108, 110 are now substantially identical to each other with the halves and openings 124, 126 being substantially symmetrical about centerline 102.

Figure 8:
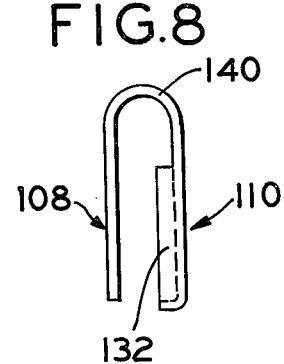

In the next step schematically shown in FIG. 8, blank halves 108, 110 are formed or bent toward each other with flanges 132, 134 and 136 in blank halves 100 facing inwardly toward blank half 108. During this forming, a radius or curved transition zone 140 is provided between the halves and includes centerline 102 at the uppermost portion thereof.

Figure 9:
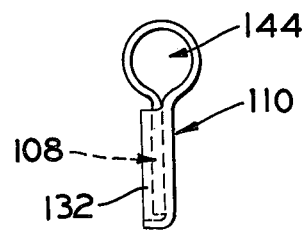

The next step is schematically shown in FIG. 9 wherein the partially formed body of FIG. 8 is placed over a mandrel and mechanically formed so that a portion of the halves, including radius or curved transition zone 140, are formed into a closed generally cylindrical area designated 144 with blank halves 108, 110 brought into engagement with each other. In this position, flange 132 will extend over the outermost edge 104 of blank half 108 and flanges 134, 136 will extend through and be closely spaced to the associated peripheral edges of those portions of first and second openings 124, 126 included in blank half 108.

Figure 10:
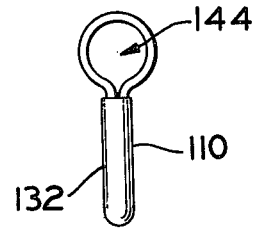

Finally, and in FIG. 10, flanges 132, 134 and 136 are crimped, rolled or otherwise bent over onto blank half 108 to rigidly and permanently retain the blank halves in a close spaced position with each other. The final step schematically shown in FIG. 10 results in a body or frame identical to that shown in greater detail in FIG. 2 and identified by numeral 10 therein. Further, the cylindrical area schematically shown in FIGS. 9 and 10 and generally designated 144 therein corresponds to cylindrical locking member receiving openings designated 50, 52 and 54 in FIG. 2. As hereinabove noted, receiving openings 54 is formed to have a smaller diameter than receiving opening 50, 52 and the formation of this smaller diameter receiving area may be performed in a conventional manner directly with and on the forming mandrel discussed with reference to FIG. 9.

Passivation of the body or frame is performed following both blanking and final forming. The addition of any protective cover or coating such as a fluoropolymer coating may also be conveniently effected at this time using conventional techniques. Once the final body configuration has been obtained as schematically shown in FIG. 10, it is then merely necessary to provide a locking member or pin structure, a biasing member and a handle or keeper. These additional components are generally designated by numerals 12, 14 and 16, respectively, in FIG. 2 as discussed in detail hereinabove in conjunction therewith.

With the preferred embodiment of the present invention has been described in detail not only with reference to the specific configuration and materials to be employed therefore, it should be appreciated that other configurations and materials may also be readily adapted to use without departing from the intent or scope of the present invention. For example, materials other than stainless steel could be advantageously employed for the body, locking pins and scond sleeve structures and materials other than the specific plastics noted hereinabove could be advantageously employed for the first sleeve structure. Moreover, it would be possible to form body or frame member 10 from a single piece of metal or other material to thereby eliminate forming of the body from a developed sheet metal blank. In such an alternative, however, the thickness of the single piece of metal or other material would desirably be at least equal to the thickness of the body or frame 10 formed by the method described hereinabove in detail.

The invention has been described with reference to the preferred embodiment. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. A jib hank comprising:
a generally planar hank body having spaced apart inner and outer edges and spaced apart end edges, said body including first and second separate member receiving recess areas adapted to hold a jib stay and a jib, respectively, extending inwardly from said inner edge toward said outer edge, said inner edge including recess area locking member receiving means thereon; an elongated locking member received in said receiving means for selectively closing said first and second recess areas, said locking member being selectively longitudinally movable between a first normal position blocking both of said recess areas and a second position whereby at least one of said recess areas is opened; biasing means for continuously urging said locking member to said first position; and, means for moving said locking member from said first toward said second position.

2. The jib hank as defined in claim 1 wherein said hank body includes a web area extending from said inner edge between said first and second recess areas.

3. The jib hank as defined in claim 2 wherein said locking member receiving means comprises receiving openings disposed along said inner edge adjacent said end edges and at said web, said openings being coaxial with the common axis thereof being generally parallel to the plane of said hank body.

4. The jib hank as defined in claim 3 wherein said common axis is included in the plane of said hank body.

5. The jib hank as defined in claim 3 wherein said receiving openings are defined by hollow generally cylindrical areas disposed at said hank body inner edge.

6. The jib hank as defined in claim 5 wherein said hank body is formed from a developed sheet metal blank with said recess areas and generally cylindrical areas integrally formed therein.

7. The jib hank as defined in claim 1 wherein said locking member receiving means slidably embraces said locking member at least adjacent said body end edges.

8. The jib hank as defined in claim 7 wherein said locking member comprises an elongated member having inner and outer ends with the distance between said ends being such that when said locking member is in said first position the inner end is embraced by the receiving means disposed adjacent one body end edge with the outer end protruding through the receiving means disposed adjacent the other body end edge, a portion of said locking member moving longitudinally through at least the receiving means adjacent said other body end edge as said locking member is moved between said first to said second positions.

9. The jib hank as defined in claim 8 wherein said locking member inner end includes an outwardly extending shoulder adapted to be closely slidably received in the receiving means adjacent said one body end edge, said locking member further including first and second sleeves received thereon with said first sleeve having a length to at least cover said first recess opening and said second sleeve having a length to at least cover said second recess opening when said locking member is in said first position.

10. The jib hank as defined in claim 9 wherein said second sleeve has an inside diameter greater than the outside diameter of said first sleeve and an outside diameter which prevents said second sleeve from passing through the receiving means adjacent said other body end edge such that as said locking member is moved from said first toward said second position to open at least said first recess area at least a portion of said first sleeve is received in said second sleeve.

11. The jib hank as defined in claim 10 wherein said second sleeve includes an internal shoulder therein and said biasing means comprises spring biasing means operably disposed over said locking member between said shoulder and said first sleeve.

12. The jib hank as defined in claim 11 wherein said spring biasing means comprises a tapered coil spring with one end thereof engaging said locking member adjacent said first sleeve and the other end engaging the inside wall of said second sleeve adjacent said internal shoulder.

13. The jib hank as defined in claim 9 wherein said at least first sleeve is comprised of a plastic material.

14. The jib hank as defined in claim 7 wherein said receiving means further slidably embraces said locking member between said first and second recess areas.

15. The jib hank as defined in claim 8 wherein said moving means comprises a handle removably affixed to said locking member adjacent said outer end on the outboard side of said receiving means adjacent said other body end edge, said handle engaging said outboard side when said locking member is in said first position to prevent disassociation of said locking member from said body.

16. A snap hook comprising:
a generally planar hook body having spaced apart inner and outer edges and spaced apart end edges, said body including first and second recess areas adapted to hold a jib stay and a jib, respectively, extending inwardly from said inner edge toward said outer edge with a body web area extending from said inner edge between said recess areas, said inner edge including coaxial locking member receiving openings spaced therealong with the common longitudinal axis of said openings being generally parallel to the plane of said body; an elongated locking member slidably received in said receiving openings for selectively closing said first and second recess areas, said locking member slidably received in said receiving openings for selectively closing said first and second ecess areas, said locking member being selectively longitudinally movable between a first normal position blocking both of said recess areas and a second position whereby at least one of said recess areas is opened, said locking member having inner and outer ends with the distance between said ends being such that when said locking member is in said first position the inner end thereof is slidably embraced by a receiving opening disposed adjacent one body edge with the outer end thereof protruding through a receiving opening disposed adjacent the other body end edge, as said locking member is moved between said first and said second positions; biasing means for continuously urging said locking member toward said first position, and means for moving said locking member from said first toward said second position.

17. The snap hook as defined in claim 16 wherein said receiving openings are defined by hollow generally cylindrical areas disposed at said body inner edge.

18. The snap hook as defined in claim 16 wherein said locking member inner end includes an outwardly extending shoulder adapted to be closely slidably received in a receiving opening disposed adjacent said one body end edge, said locking member further including first and second sleeves received thereon with said first sleeve having a length so as to at least cover said first recess opening and said second sleeve having a length so as to at least cover said second recess opening when said locking member is in said first position.

19. The snap hook as defined in claim 18 wherein said second sleeve has an inside diameter greater than the outside diameter of said first sleeve and an outside diameter which prevents said second sleeve from passing through a receiving opening disposed adjacent said other body end edge such that as said locking member is moved from said first toward said second position to open at least said first recess area at least a portion of said first sleeve is received in said second sleeve.

20. The snap hook as defined in claim 19 wherein said second sleeve includes an internal shoulder therein and said biasing means comprises spring biasing means operably disposed over said locking member between said shoulder and said first sleeve.

21. The snap hook as defined in claim 20 wherein said spring biasing means comprises a tapered coil spring with one end thereof engaging said locking member adjacent said first sleeve and the other end engaging the inside wall of said second sleeve adjacent said internal shoulder.

22. The snap hook as defined in claim 16 wherein said moving means comprises a handle removably affixed to said locking member adjacent said outer end on the outboard side of said receiving means adjacent said other body end edge, said handle engaging said outboard side when said locking member is in said first position to prevent disassociation of said locking member from said body.

* * * * *